United States Patent
Kim

(10) Patent No.: US 7,031,332 B2
(45) Date of Patent: Apr. 18, 2006

(54) CONTROL CELL MANAGEMENT METHOD OF ATM SWITCHING SYSTEM

(75) Inventor: Ki-Taek Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 882 days.

(21) Appl. No.: 09/951,528

(22) Filed: Sep. 14, 2001

(65) Prior Publication Data

US 2002/0031128 A1  Mar. 14, 2002

(30) Foreign Application Priority Data

Sep. 14, 2000  (KR) .............................. 2000-53943

(51) Int. Cl.
*H04L 12/28* (2006.01)
(52) U.S. Cl. ................... 370/412; 370/395.1
(58) Field of Classification Search ............ 370/395.1, 370/236.1, 236.2, 412, 413, 414, 415, 416, 370/417, 418
See application file for complete search history.

(56) References Cited

U.S. PATENT DOCUMENTS

| | | | | |
|---|---|---|---|---|
| 5,557,609 A | * | 9/1996 | Shobatake et al. | 370/395.71 |
| 5,663,959 A | * | 9/1997 | Nakagawa | 370/236.2 |
| 5,774,662 A | * | 6/1998 | Sakagawa | 370/395.54 |
| 5,995,507 A | * | 11/1999 | Fujita | 370/395.71 |
| 6,137,795 A | * | 10/2000 | Tominaga et al. | 370/375 |

* cited by examiner

*Primary Examiner*—Ricky Q. Ngo
*Assistant Examiner*—Christine Ng
(74) *Attorney, Agent, or Firm*—Fleshner & Kim, LLP

(57) ABSTRACT

A control cell management method and apparatus of switching system are disclosed. The invention includes storing an address of a pertinent control cell reception buffer buffering a first-arrived new control cell, when the new control cell is received during a transmission of output control cells. Reception processing of the pertinent control cell reception buffer is then performed using the stored address when the transmission of the output control cells is finished.

24 Claims, 7 Drawing Sheets

FIG. 4A
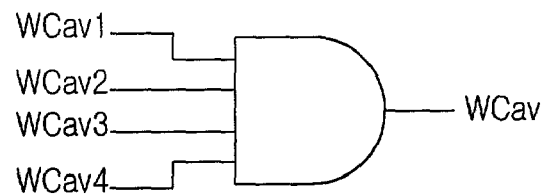
FIG. 4B
| INPUT | | | OUTPUT | | | |
|---|---|---|---|---|---|---|
| SelAddr[1] | SelAddr[0] | WEnb | WEnb1 | WEnb2 | WEnb3 | WEnb4 |
| 0 | 0 | 0 | 0 | 0 | 0 | 0 |
| 0 | 1 | 0 | 0 | 0 | 0 | 0 |
| 1 | 0 | 0 | 0 | 0 | 0 | 0 |
| 1 | 1 | 0 | 0 | 0 | 0 | 0 |
| 0 | 0 | 1 | 1 | 0 | 0 | 0 |
| 0 | 1 | 1 | 0 | 1 | 0 | 0 |
| 1 | 0 | 1 | 0 | 0 | 1 | 0 |
| 1 | 1 | 1 | 0 | 0 | 0 | 1 |
FIG. 4C
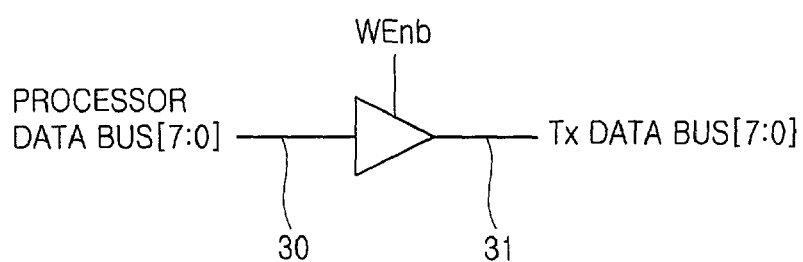

FIG. 5A
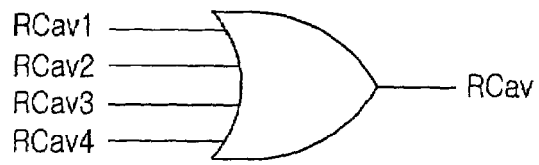
FIG. 5B
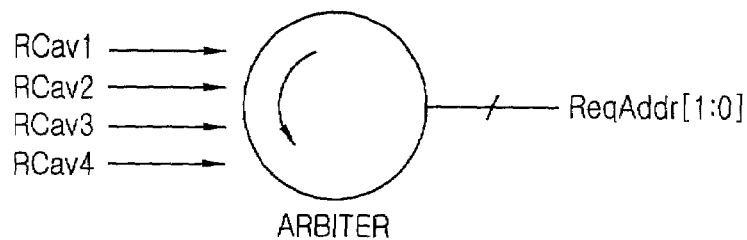
ARBITER
FIG. 5C
| INPUT | | | OUTPUT | | | |
|---|---|---|---|---|---|---|
| SelAddr[1] | SelAddr[0] | REnb | REnb1 | REnb2 | REnb3 | REnb4 |
| 0 | 0 | 0 | 0 | 0 | 0 | 0 |
| 0 | 1 | 0 | 0 | 0 | 0 | 0 |
| 1 | 0 | 0 | 0 | 0 | 0 | 0 |
| 1 | 1 | 0 | 0 | 0 | 0 | 0 |
| 0 | 0 | 1 | 1 | 0 | 0 | 0 |
| 0 | 1 | 1 | 0 | 1 | 0 | 0 |
| 1 | 0 | 1 | 0 | 0 | 1 | 0 |
| 1 | 1 | 1 | 0 | 0 | 0 | 1 |
FIG. 5D
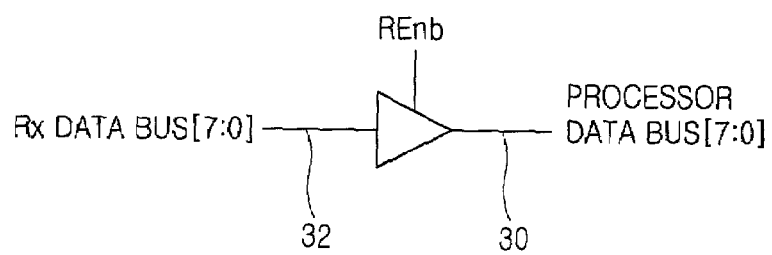

* RCav4,RCav3,RCav2,RCav1 / REQADDR1,REQADDR0

CONTROL CELL MANAGEMENT METHOD OF ATM SWITCHING SYSTEM

BACKGROUND OF THE INVENTION

1. Field of the Invention

The present invention relates to an Asynchronous Transfer Mode (ATM) switching system and, in particular, to a control cell management method of an ATM switching system.

2. Background of the Related Art

An ATM communication divides a message into a plurality of ATM cells that each have 53 bytes. Once the cells are formatted, they are communicated through a transmission medium.

FIG. 1 is a block diagram illustrating a general ATM. The ATM switching system 10 includes an access switching apparatus 11, 14, an interconnection network apparatus 12, and an operation and maintenance apparatus 13. The access switching apparatus 11, 14 performs a switching function with the other base stations 1, 2, 3 to which it is connected, the interconnection network apparatus 12 interconnects each apparatus of the ATM switching system, and the operation and maintenance apparatus 13 manages and maintains the ATM switching system.

Generally, an ATM cell can be categorized as a user cell, for data transmission between users, and a control cell that processes and controls various calls in order to transmit the user cell. When base station 1 transmits a user cell, the user cell is transmitted to the access switching apparatus 11 of the ATM switching system 10, is routed in the interconnection network apparatus 12, and arrives in a particular destination after passing the access switching apparatus 14.

The control cell can be further categorized as a signaling cell, which transmits a control signal between ATM switching systems, and an Inter Processor Communication (IPC) cell that performs communication between each apparatus 11, 12, 13, 14 of the ATM switching system. The control cell is transmitted to a processor of the access switching apparatus 11 and performs a function, such as a call connection, a call release, a state report of the access switching apparatus 11, within the access switching apparatus.

A signaling cell can be further categorized as a signaling cell for call processing, a contact, a contact acceptance, and a setting. Signaling cells are used for a point-to-point contact set, a point-to-point release, a point-to-point release completion, an inquiry about a state of a pertinent apparatus, a restart, a restart acceptance in connection-management, an addition of another point, an addition acceptance of another point in association of one point-to-multipoint, a removal of the point, and a removal acceptance of the point.

An IPC cell can be used differently in each ATM switching system. An IPC cell is mainly used for communication between the operation and maintenance apparatus 13, managing the whole ATM switching system 10, and each apparatus of the ATM switching system 10. The IPC cell has information regarding the states, inspection, contact registration, and release of each apparatus of the ATM switching system 10.

The access switching apparatus 11, 14 of the ATM switching system 10 is constructed so as to include a plurality of the switching functions of the other base stations. Each access switching apparatus 11, 14 is functionally constructed to correspond with the base station with which it is connected.

FIG. 2 is a block diagram illustrating signaling cells for transmission and reception with base stations 1, 2 and IPC cells for transmission and reception with internal devices of the ATM switching system 10, when the access switching apparatus 11 is connected to two other base stations 1, 2.

FIG. 3 is a block diagram illustrating internal units of the access switching apparatus 11 of FIG. 1. The access switching apparatus 11 includes control (signaling) cell transmission and reception buffers $23a$, $23b$, $24a$, $24b$ that transmit and receive signaling cells with base stations 1, 2, respectively. Access switching apparatus 11 has control cell (IPC) transmission and reception buffers $23c$, $23d$, $24c$, $24d$ that transmit and receive IPC cells with the apparatuses of the ATM switching system 10. It has a signaling control cell First-In First-Out (FIFO) management unit 22 that manages the control (signaling) of the cell transmission and reception buffers $23a$, $23b$, $24a$, $24b$ and the cell transmission and reception buffers $23c$, $23d$, $24c$, $24d$. Additionally, it has a processor 21 that controls the overall operation of the access switching apparatus 11.

In more detail, the first control (signaling) cell transmission FIFO $23a$ (hereinafter, a buffer is referred to as a FIFO) buffers a signaling cell to be transmitted to base station 1, the second control (signaling) cell transmission FIFO $23b$ buffers a signaling cell to be transmitted to base station 2, the first control (signaling) cell reception FIFO $24a$ buffers a signaling cell received from base station 1, and the second control (signaling) cell reception FIFO $24b$ buffers a signaling cell received from base station 2. Third and fourth control (IPC) cell transmission FIFOs $23c$, $23d$ buffer IPC cells to be transmitted to particular internal devices of the ATM switching system 10, respectively. Third and fourth control (IPC) cell reception FIFOs $24c$, $24d$ buffer IPC cells received from particular internal devices of the ATM switching system 10, respectively.

As depicted in FIG. 3, the access switching apparatus 11 accepts two access lines, buffers the signaling cells and the IPC cells in the eight control cell transmission and reception FIFOs $23a$~$23d$, $24a$~$24d$, and transmits the signaling cells and the IPC cells between the eight control cell transmission and reception FIFOs $23a$~$23d$, $24a$~$24d$ and processor 21, by jointly controlling a data bus with the processor 21. Processor 21 can transmit or receive only one control cell at a time using the data bus. When communicating cells between the eight FIFOs $23a$–$23d$, $24a$–$24d$ and the processor 21, the cells must be prioritized and the bus arbitrated to communicate the cells across the shared bus according to their respective priorities.

Processor 21 uses a Universal Test Operation Physical Layer Protocol Interface for ATM (UTOPIA) protocol as a master. The UTOPIA protocol is used between an ATM layer device and a physical layer device. The protocol has been standardized in an ATM forum and is capable of performing a seamless communication without affecting an ATM layer, which is a superior layer. The seamless communication is possible, regardless of the interface with a physical layer, due to a clarifying relationship between the ATM layer and a physical layer provided by the UTOPIA protocol.

When there is a control cell to be transmitted, the processor 21 transmits the control cell to the signaling control cell FIFO management unit 22, through an 8-bit data bus, using the UTOPIA interface.

Generally, the transmission of control cells precedes the reception of control cells in priority. Accordingly, when there are control cells to be received during the transmission of control cells, the cells to be received have to wait in the control cell reception FIFO $24a$~$24d$.

After the transmission of the control cells is finished, the signaling control cell FIFO management unit 22 notifies the control cell reception FIFO, buffering the most recently arrived control cell, and requests a physical layer address of the pertinent control cell reception FIFO. Processor 21 selects the pertinent control cell reception FIFO to communicate the most recently arrived control cell.

As described above, when a control cell arrives during the transmission of other control cells, the related art ATM switching system does not recognize a first-arrived control cell but recognizes the most recently arrived control cell. When the transmission of control cells is finished, the reception processing of control cells starts with the most recently arrived control cell. Accordingly, the reception processing reverses the order of arrival for the control cells and may unduly delay their communication to the processor 21. In other words, processing of a first-arrived control cell in a pertinent control cell reception FIFO can not be performed until all other control cells that subsequently arrived in the other control cell reception FIFOs are processed.

Because the processing of control cells is not performed according to their order of arrival, the control signaling processing speed of the access switching apparatus and the performance of the ATM switching system are diminished.

SUMMARY OF THE INVENTION

An object of the invention is to solve at least the above problems and/or disadvantages and to provide at least the advantages described hereinafter.

An object of the present invention is to improve the performance of an ATM switching system.

Another object is to efficiently manage control cells in their communication between a processor and an ATM processing apparatus using a shared data bus.

Another object of the present invention is to minimize the delay of control cell processing by inspecting the arrival times of control cells in the control cell reception FIFOs, storing an address of a pertinent control cell FIFO buffering a first-arrived control cell, and starting the reception processing with the FIFO buffering the first-arrived control cell, when the transmission of control cells is finished.

In order to achieve the objects of the present invention, there is provided a control cell management method of an ATM switching system including determining priority in the transmission and reception of control cells by a processor, storing an address of a pertinent control cell reception FIFO buffering a first-arrived new control cell, and performing reception processing from the pertinent control cell reception FIFO buffering the first-arrived new control cell, using the stored address when the transmission of control cells is finished.

In order to achieve the objects of the present invention, there is provided a control cell management method of an ATM switching system in accordance with another embodiment of the present invention including determining priority in the transmission and reception of control cells by a processor, when control cells are transmitted and received using a shared data bus between the processor and ATM processing units, inspecting the arrival time of new control cells in each control cell reception FIFO using the data bus, storing an address of a pertinent control cell reception FIFO buffering a first-arrived control cell, receiving the first-arrived control cell from the pertinent control cell reception FIFO, and inspecting the arrival time of new control cells starting from a control cell reception FIFO next to the pertinent control cell reception FIFO.

In order to achieve the objects of the present invention, there is provided a control cell management method of an ATM switching system in accordance with still another embodiment of the present invention including inspecting the arrival time of new control cells in each control cell reception FIFO by a processor by using one data bus between the processor and a FIFO management unit for an ATM process, storing an address of a pertinent control cell reception FIFO buffering a first-arrived control cell, transmitting the stored address of the pertinent control cell reception FIFO to the processor when the transmission is finished, setting a physical layer address of the pertinent control cell reception FIFO by the processor, fetching the first-arrived control cell from the pertinent control cell reception FIFO by using the set physical layer address, transmitting the fetched first-arrived control cell to the processor through the data bus in an available state, and inspecting the arrival times of new control cells starting from a control cell reception FIFO next to the pertinent control cell reception FIFO.

The objects of the present invention may be achieved in whole or in part by a control cell processing method of a switching system, including identifying a first buffer that receives a first-arrived control cell; and communicating the first-arrived control cell to a processor for processing using a shared data bus, before processing a later-arrived control cell.

The objects of the present invention may be further achieved in whole or in part by a control cell switching apparatus, including a processor that processes control cells communicated by the apparatus; a plurality of receive buffers that buffer control cells communicated by an external device to the processor; a shared data bus between the processor and the receive buffers for communicating the control cells; and an input and output (I/O) controller that prioritizes the use of the shared data bus by the receive buffers, wherein the I/O controller identifies a first receive buffer of the receive buffers that receives a first-arriving control cell and communicates the first-arriving control cell to the processor using the shared data bus, before communicating a later-arriving control cell.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 4A illustrates a device of a signaling control cell FIFO management unit generating a signal (WCav) that indicates the transmission preparation of each control cell transmission FIFO.

FIG. 4B illustrates a tabular method for selecting a control cell transmission FIFO to be written a control cell.

FIG. 4C illustrates a device of the signaling control cell FIFO management unit selecting a control cell to be transmitted, in accordance with a transmission enable signal (WEnb) outputted from a processor.

FIG. 5A illustrates a device of the signaling control cell FIFO management unit generating a signal (RCav) to indicate whether a control cell has been received by any of the control cell reception FIFOs.

FIG. 5B illustrates an arbiter of the signaling control cell FIFO management unit arbitrating reception of control cells between control cell reception FIFOs.

FIG. 5C illustrates a tabular method for selecting a control cell reception FIFO to receive a control cell.

FIG. 5D illustrates a device of the signaling control cell FIFO management unit selecting a control cell to be received, in accordance with a reception enable signal (REnb) outputted from a processor.

DETAILED DESCRIPTION OF PREFERRED EMBODIMENTS

Referring now to FIGS. 3–5D, a UTOPIA level 2 protocol is used between a processor 21 and a signaling control cell FIFO management unit 22 of the access switching apparatus 11. The signaling control cell FIFO management unit 22 includes devices performing functions related to the transmission of control cells from the processor 21 to a pertinent control cell transmission FIFO, as depicted in FIGS. 4A~4C. Additionally, it includes devices performing functions related to the reception of control cells from each control cell reception FIFO, as depicted in FIGS. 5A~5D.

FIG. 4A is a block diagram illustrating a device of a signaling control cell FIFO management unit 22 that generates a signal (WCav) indicating the transmission preparation of each control cell transmission FIFO 23a–23d. FIG. 4B is a table illustrating a method for selecting a control cell transmission FIFO to be written a control cell, in accordance with a physical layer address and a transmission enable signal (WEnb) outputted from the processor 21. FIG. 4C is a block diagram illustrating a device of the signaling control cell FIFO management unit 22 that selects a control cell to be transmitted, in accordance with a transmission enable signal (WEnb) outputted from the processor 21.

FIG. 5A is a block diagram illustrating a device of the signaling control cell FIFO management unit 22 that generates a signal (RCav) indicating whether any of cell reception FIFOs 24a~24d has a received control cell. FIG. 5B is a block diagram illustrating an arbiter of the signaling control cell FIFO management unit 22 that arbitrates the reception of control cells between the control cell reception FIFOs 24a~24d, by examining each control cell reception FIFO 24a~24d using a rotational method. FIG. 5C is a table illustrating a method for selecting a pertinent control cell reception FIFO to read a control cell to the processor 21, in accordance with a physical layer address and a reception enable signal (REnb) outputted from the processor 21. FIG. 5D is a block diagram illustrating a device of the signaling control cell FIFO management unit 22 selecting a control cell to be received, in accordance with a reception enable signal (REnb) outputted from the processor 21.

Figure 1:
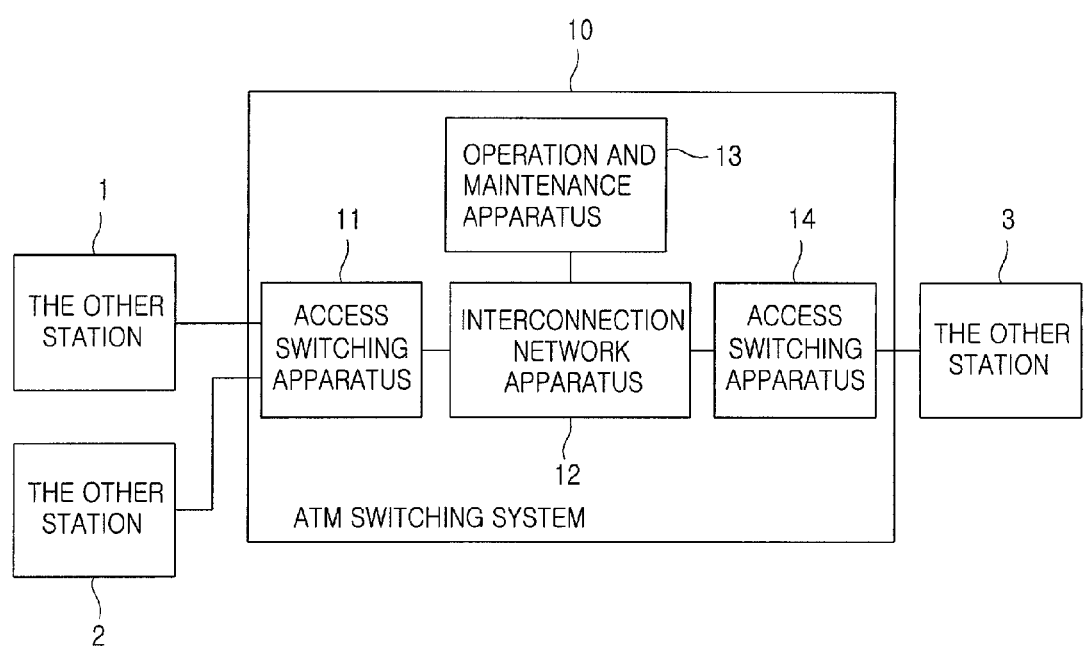
FIG. 1 illustrates a general ATM switching system.
Figure 2:
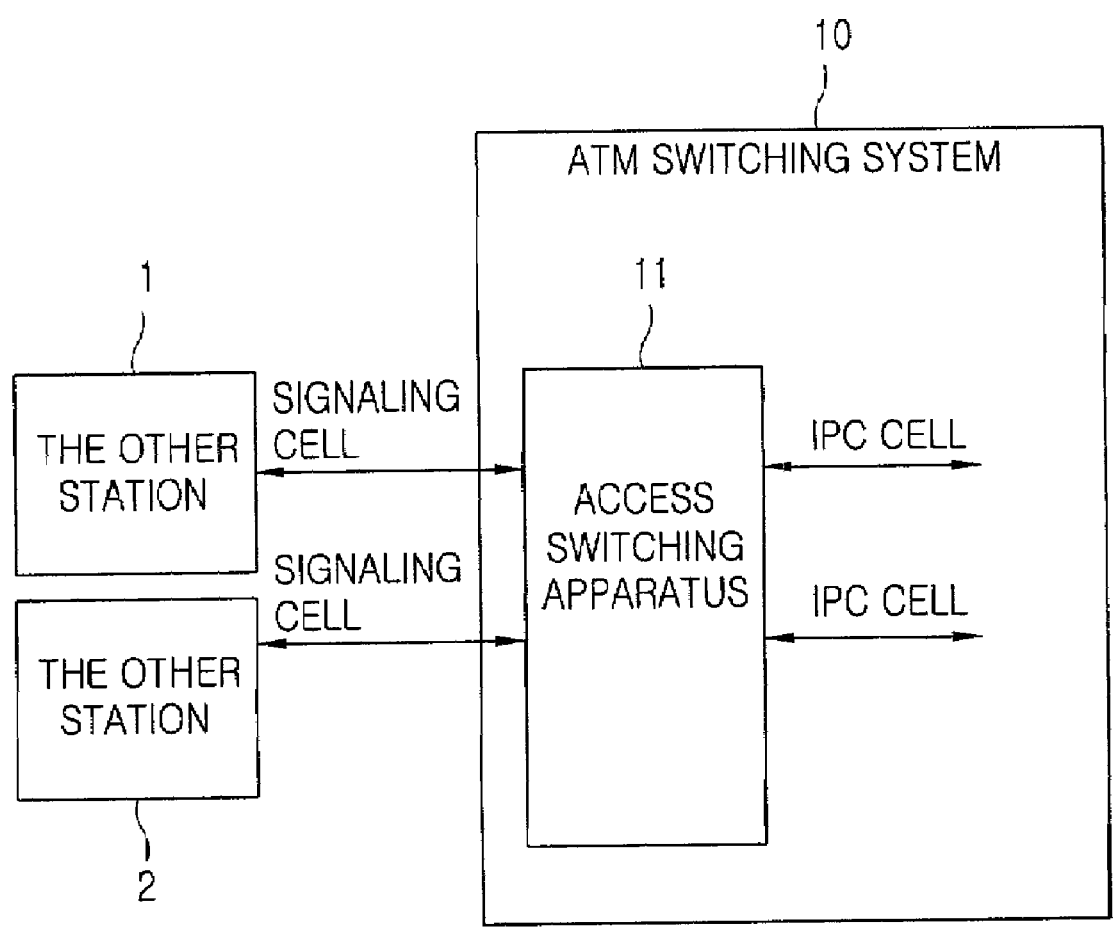
FIG. 2 illustrates the transmission of control cells in a general access switching apparatus that accepts a plurality of access lines.
Figure 3:
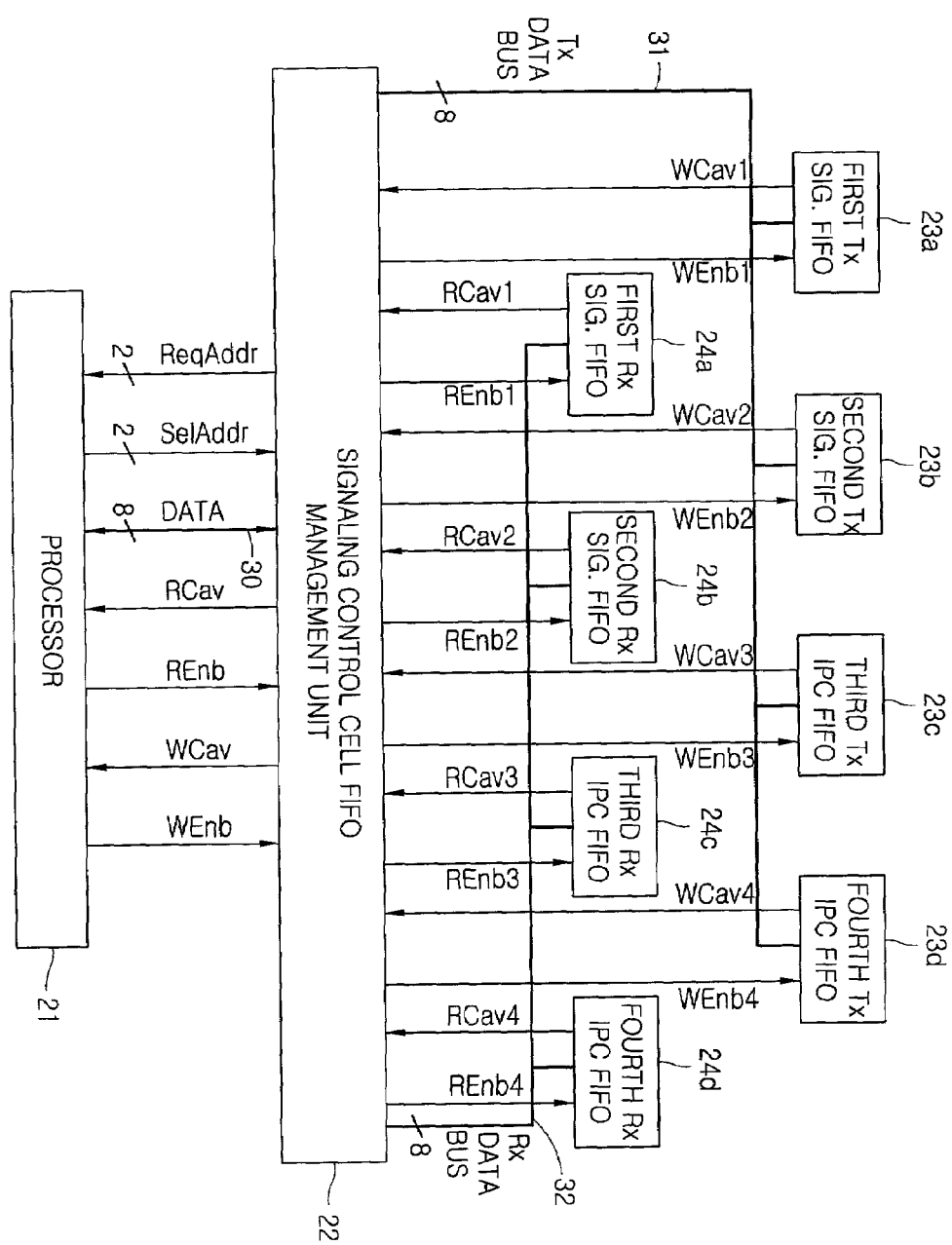
FIG. 3 illustrates the internal units of the access switching apparatus of FIG. 2.
Figure 6:
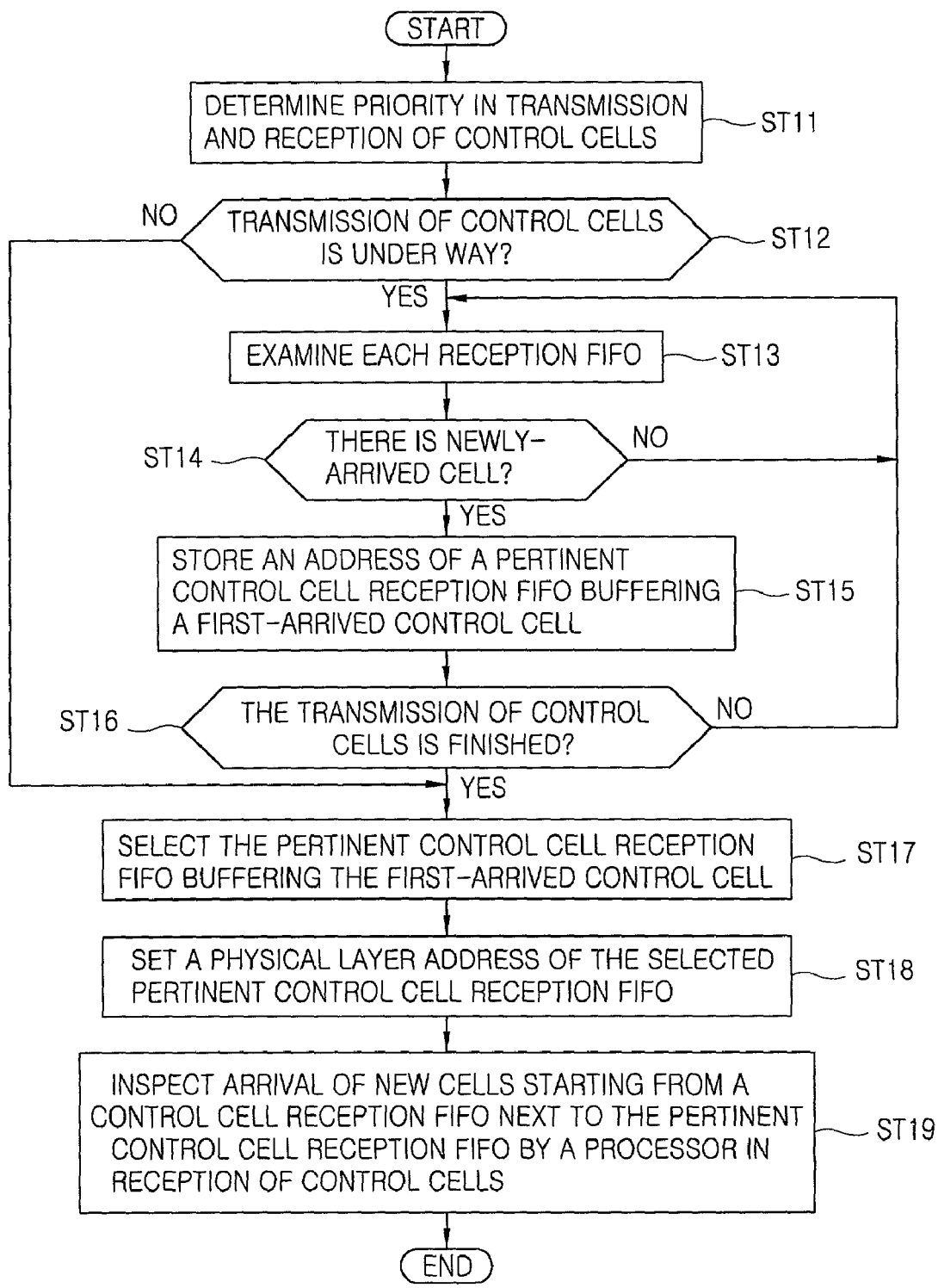
FIG. 6 illustrates a control cell management method of an ATM switching system, in accordance with an embodiment of the present invention.

FIG. 6 is a flow chart illustrating a control cell management method of an ATM switching system. Priority in the transmission and reception of the control cells within the FIFOs is examined using the rotational method to inspect the arrival of control cells. An address of a pertinent control cell reception FIFO that buffers a first-arrived control cell is stored. When the transmission of control cells is finished, the processor 21 starts a reception processing of the first-arrived control cell, which arrived during the transmission processing, and then inspects the arrival of control cells starting from the control cell reception FIFO next to the pertinent control cell reception FIFO.

Processor 21 determines the transmission and reception priority of control cells by operating as a master, as shown at ST11. When higher priority is given to the transmission of control cells than to the reception of control cells, processor 21 performs the transmission of control cells first. The transmission operation will now be described in more detail.

A first control (signaling) cell transmission FIFO 23a, a second control (signaling) cell transmission FIFO 23b, a third control (IPC) cell transmission FIFO 23c, and a fourth control (IPC) cell transmission FIFO 23d output the WCav1, WCav2, WCav3, WCav4 signals, respectively. These signals indicate whether the respective FIFOs are ready to receive a cell from the processor 21. As depicted in FIG. 4A, the signaling control cell FIFO management unit 22 performs an AND logic operation after receiving the WCav1, WCav2, WCav3, WCav4 signals and outputs a write ready signal (WCav) to the processor 21.

When all of the control cell transmission FIFOs 23a~23d are ready to receive control cells, the processor 21 selects a physical layer address of a pertinent control cell transmission FIFO and transmits a physical layer address selection signal (SelAddr[1:0]) with the selected physical layer address to the signaling control cell FIFO management unit 22. A transmission enable signal (WEnb) is also transmitted to the signaling control cell FIFO management unit 22. The signaling control cell FIFO management unit 22 selects a pertinent control cell transmission FIFO to receive the control cell, in accordance with the physical layer address selection signal (SelAddr[1:0]) and transmission enable signal (WEnb). The control cell is transmitted to the pertinent control cell transmission FIFO via the processor data bus 30 and the Tx data bus 31, in accordance with the transmission enable signal (Wenb).

As depicted in FIG. 4B, when a physical layer address selection signal (SelAddr) and a transmission enable signal (WEnb) are "00" and "1", respectively, the signaling control cell FIFO management unit 22 outputs a transmission enable signal (WEnb1) to the first control (signaling) cell transmission FIFO 23a. According to this, a control cell is transmitted from the processor 21 to the first control (signaling) cell transmission FIFO 23a. The Wenb signal enables the eight bit data to move from the processor data bus 30 to the Tx data bus 31, as illustrated in FIG. 4C.

While the processor 21 transmits the control cell as shown at ST 12, the signaling control cell FIFO management unit 22 inspects the arrival of new control cells by examining the four control cell reception FIFOs 24a~24d using the rotational method, as shown at ST13. When control cells arrive, the first control (signaling) cell reception FIFO 24a, second control (signaling) cell reception FIFO 24b, third control (IPC) cell reception FIFO 24c, and fourth control (IPC) cell reception FIFO 24d output the RCav1 RCav2, RCav3, RCav4) signals, respectively. These signals indicate the existence of received cells to be read to the signaling control cell FIFO management unit 22.

As depicted in FIG. 5A, the signaling control cell FIFO management unit 22 performs an OR logic operation of the RCav1, RCav2, RCav3, RCav4 signals. By logically OR ing these signals, the signaling control cell FIFO management unit 22 can determine whether there are newly arrived control cells to be communicated to the processor 21. If so, the OR circuit outputs a signal (RCav) to the processor 21. In addition, as depicted in FIG. 5B, the signaling control cell FIFO management unit 22 selects an address of the control cell reception FIFO buffering the first-arrived control cell, as shown at ST14. The selected address is stored in a register of the signaling control cell FIFO management unit 22, as shown at ST15.

When the transmission of control cells by the processor 21 is finished, as shown at ST16, the signaling control cell FIFO management unit 22 transmits the stored address of the pertinent control cell reception FIFO to the processor 21 and requests reception processing, as shown at ST17. More descriptively, when the transmission of control cells is finished, the processor 21 recognizes there is a control cell to be read due to the signal (RCav) outputted from the signaling control cell FIFO management unit 22. The signaling control cell FIFO management unit 22 transmits a physical layer address request signal (ReqAddr[1:0]) to the processor 21 that requests a physical layer address of the pertinent control cell reception FIFO buffering the first-arrived control cell.

As depicted in FIG. 5C, when the control cell reception FIFO buffering the first-arrived control cell is the third control (IPC) cell reception FIFO 24c, the processor 21 outputs a physical layer address selection signal (SelAddr [1:0]) as "10" to select a physical layer address of the third control (IPC) cell reception FIFO 24c. In addition, processor 21 outputs a read enable signal (REnb) as "1" to the signaling control cell FIFO management unit 22. The signaling control cell FIFO management unit 22 sets the physical layer address of the third control (IPC) cell reception FIFO 24c by outputting a signal (REnb3) as an active state in accordance with the signals (SelAddr[1:0], REnb), as shown at ST18. As depicted in FIG. 5D, the signaling control cell FIFO management unit 22 reads the control cell from the third control (IPC) cell reception FIFO 24c on Rx data bus 32 and transmits the control cell to the processor data bus 30, under the control of the Renb signal.

While processor 21 receives the control (IPC) cell from the third control (IPC) cell reception FIFO 24c, the signaling control cell FIFO management unit 22 inspects the arrival of control cells starting from the fourth control (IPC) cell reception FIFO 24d, which is the next adjacent control (IPC) cell reception FIFO, as shown at ST19.

Figure 7:
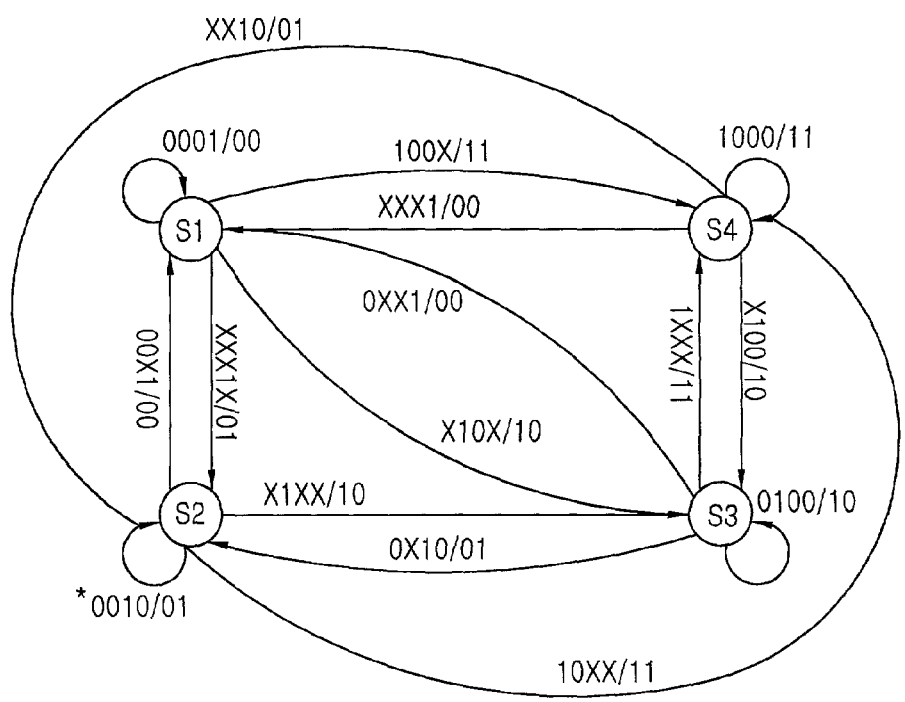
FIG. 7 illustrates a state diagram of the arbiter of FIG. 5B.

FIG. 7 is a state diagram of the arbiter of FIG. 5B. The RCav1, RCav2, RCav3, RCav4 signals provided as inputs to the arbiter are identified in association with each state transition, as the first four values preceding the "1." The physical layer address request signal (ReqAddr[1:0]) generated by the arbiter in response to the four-bit input is identified by the two digits following the "1." Accordingly, the arbiter generates a two bit output in response to the four bit input.

The arbiter can have four states S1, S2, S3, and S4 in accordance with input signals RCav1, RCav2, RCav3, RCav4. For example, when the RCav1, RCav2, RCav3, and RCav4 signals have the values of 1, 0, 0, and 0, respectively, while in the S1 state, the arbiter generates an output of "00." In more detail, when only the RCav1 signal among the RCav1, RCav2, RCav3, and RCav4 signals has a value of "1", it means a control cell has arrived in the first control (signaling) cell reception FIFO 24a, which has outputted the RCav1 signal to indicate this circumstance. The arbiter recognizes that the control cell has arrived in the first control (signaling) cell reception FIFO 24a and outputs a ReqAddr [1:0] signal bit pattern of "00," to request a physical layer address of the first control (signaling) cell reception FIFO 24a.

In step ST19, processing of the control cell in the third control (IPC) cell reception FIFO 24c is performed and, therefore, the arbiter is in the S3 state. While in state S3, the signaling control cell FIFO management unit 22 determines whether a newly arrived control cell has been received by any of the control cell reception FIFOs 24a–24d, beginning with a determination in reception FIFO 24d. After checking reception FIFO 24d, a determination is sequentially made in reception FIFOs 24a–24c.

When a bit pattern of "1XXX", representing the values of RCav4, RCav3, Rcav2, RCav1, respectively, is inputted to the arbiter in the S3 state, the arbiter recognizes that a new control cell has arrived in the fourth control (IPC) cell reception FIFO 24d. The arbiter generates a bit pattern of "11" to identify the address of the fourth control (IPC) cell reception FIFO 24d and makes a transition to the S4 state. When a bit pattern of "0XX1" is provided to the arbiter, the arbiter recognizes that a new control cell has not arrived in the fourth control (IPC) cell reception FIFO 24d but has arrived in the first control (signaling) cell reception FIFO 24a. Therefore, the arbiter outputs a bit pattern of "00" to identify an address of the first control (signaling) cell reception FIFO 24a and makes a transition to the S1 state.

As described above, the arbiter inspects the arrival of control cells, performs a reception processing for a control cell reception FIFO buffering a first-arrived control cell, and inspects the arrival of new control cells starting from a control cell reception FIFO next to the control cell reception FIFO presently having a control cell being processed.

As described above, the control cell management method of the ATM switching system in accordance with the present invention inspects the arrival of control cells in the control cell reception FIFO during the transmission of control cells, stores an address of a pertinent control cell reception FIFO buffering a first-arrived control cell, and starts reception processing from the pertinent control cell reception FIFO buffering the first-arrived control cell, when the transmission of control cells is finished. Accordingly, the control cell management method of the ATM switching system in accordance with the present invention can improve a processing speed of an access switching apparatus and the performance of an ATM switching system by minimizing delay in reception processing of control cells.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A control cell management method of a switching system, comprising:
   storing an address of a pertinent control cell reception buffer which buffers a first-arrived new control cell, when the first-arrived new control cell is received during a transmission of output control cells; and
   performing reception processing of the pertinent control cell reception buffer using the stored address when the transmission of the output control cells is finished, wherein performing the reception processing includes:
  transmitting the stored address of the pertinent control cell reception buffer to a processor when the transmission of the output control cells is finished, and
  obtaining the first-arrived new control cell from the pertinent control cell reception buffer and transmitting the first-arrived new control cell to the processor using a physical layer address of the pertinent control cell reception buffer set by the processor.

2. The method of claim 1, wherein the pertinent control cell reception buffer comprises a First-In First-Out (FIFO) memory.

3. The method of claim 1, further comprising determining an arrival of new control cells starting from another control cell reception buffer next to the pertinent control cell reception buffer.

4. The method of claim 1, wherein performing reception processing is based on a rotational method.

5. The method of claim 4, wherein performing reception processing is further based on an order of arrival.

6. A control cell management method of an Asynchronous Transfer Mode (ATM) switching system, comprising:
  determining a priority between transmission and reception of control cells by a processor when the control cells are transmitted and received using a shared data bus between the processor and ATM processing units;
  determining an arrival of new control cells in each of a plurality of control cell reception buffers, while transmitting output control cells using the shared data bus;
  storing an address of a pertinent control cell reception buffer buffering a first-arrived new control cell;
  receiving the first-arrived new control cell from the pertinent control cell reception buffer, wherein the receiving includes:
    transmitting the stored address of the pertinent control cell reception buffer to the processor after the transmission of the output control cells is complete,
    setting a physical layer address of the pertinent control cell reception buffer by the processor,
    obtaining the first-arrived new control cell from the pertinent control cell reception buffer using the set physical layer address, and
    transmitting the obtained first-arrived new control cell to the processor through the shared data bus; and
  determining the arrival of the new control cells in one of the plurality of control cell reception buffers.

7. The method of claim 6, wherein the pertinent control cell reception buffer comprises a First-In First-Out (FIFO) memory.

8. The method of claim 6, further comprising determining the arrival of the new control cells starting from another control cell reception buffer next to the pertinent control cell reception buffer.

9. The method of claim 8, wherein the address of the pertinent control cell reception buffer buffering the first-arrived new control cell is stored in a register of a signaling control cell FIFO management unit.

10. The method of claim 6, wherein determining the arrival of the new control cells starts from another control cell reception buffer next to the pertinent control cell reception buffer.

11. A control cell processing method of a switching system, comprising:
  receiving a first-arrived control cell at a first buffer;
  receiving another control cell at a second buffer different than the first buffer;
  identifying the first buffer that receives the first-arrived control cell; and
  communicating the first-arrived control cell to a processor for processing, using a shared data bus, before processing a later-arrived control cell, the method additionally including:
    associating the processing of a control cell from each $m^{th}$ buffer of n buffers with a unique $S_m^{th}$ state from a set of n states $\{S_1, S_2, S_3, S_4, \ldots, S_n\}$, and
    transitioning from a current state of the n states to a next state of the n states when an $i^{th}$ buffer of the n buffers receives a subsequent control cell and the first-arrived control cell has been processed, wherein the next state is identified by the next higher priority state in the hierarchical sequence $S_{i+1}, S_{i+2}, S_{i+3}, \ldots, S_n, S_1, S_2, S_3, \ldots, S_{i-1}$, where $S_i$ represents the current state, whose associated buffer contains the subsequent control cell.

12. The method of claim 11, further comprising determining whether a number of other buffers have received the later-arrived control cell by sequentially checking each of the number of other buffers.

13. The method of claim 11, further comprising communicating output control cells using the shared data bus while the first buffer receives the first-arrived control cell.

14. The method of claim 11, wherein the first buffer is a communication buffer of an access switching unit of an asynchronous transfer mode switching system.

15. The method of claim 11, wherein identifying the first buffer comprises identifying an address of the first buffer that receives the first-arrived control cell.

16. The method of claim 15, wherein communicating the first-arrived control cell comprises communicating the address of the first buffer and communicating the first-arrived control cell to the processor based on the address.

17. The method of claim 15, wherein the address comprises a physical layer address.

18. A control cell switching apparatus, comprising:
  a processor that processes control cells communicated by the apparatus;
  a plurality of receive buffers that buffer the control cells communicated by an external device to the processor;
  a shared data bus between the processor and the receive buffers for communicating the control cells; and
  an input and output (I/O) controller that prioritizes the use of the shared data bus by the receive buffers, wherein the I/O controller identifies a first receive buffer of the receive buffers that receives a first-arriving control cell and communicates the first-arriving control cell to the processor using the shared data bus, before communicating a later-arriving control cell, wherein:
    the I/O controller associates the processing of a control cell from each $m^{th}$ buffer of n receive buffers with a unique $S_m^{th}$ state from a set of n states $\{S_1, S_2, S_3, S_4, \ldots, S_n\}$,
    the I/O controller transitions from a current state of the n states to a next state of the n states when an $i^{th}$ buffer of the n receive buffers receives a subsequent control cell and the first-arriving control cell has been processed, and
    the next state is identified by the next higher priority state in the hierarchical sequence $S_{i+1}, S_{i+2}, S_{i+3}, \ldots, S_n, S_1, S_2, S_3, \ldots, S_{i-1}$, where $S_i$ represents the current state, whose associated buffer contains the subsequent control cell.

19. The control cell switching apparatus of claim 18, wherein the I/O controller determines whether a second receive buffer has received the later-arriving control cell by sequentially checking each of the plurality of receive buffers.

20. The control cell switching apparatus of claim 18, further comprising:
 a number of transmit buffers that buffer the control cells communicated by the processor to the external device using the shared data bus, under the control of the I/O controller, wherein
 the processor communicates output control cells using the shared data bus while the first receive buffer receives the first-arriving control cell.

21. The control cell switching apparatus of claim 18, wherein the apparatus is an access switching unit of an asynchronous transfer mode switching system.

22. The control cell switching apparatus of claim 18, wherein the I/O controller identifies the first receive buffer by an address of the receive buffer that received the first-arriving control cell.

23. The control cell switching apparatus of claim 22, wherein the I/O controller communicates the first-arriving control cell by communicating the address of the receive buffer and communicating the first-arriving control cell to the processor based on the address.

24. The control cell switching apparatus of claim 22, wherein the address comprises a physical layer address.

* * * * *